US 8,998,476 B2

(12) United States Patent
Hosoki (10) Patent No.: US 8,998,476 B2
(45) Date of Patent: Apr. 7, 2015

(54) LIGHTING DEVICE, DISPLAY DEVICE, AND TELEVISION RECEIVING DEVICE

(75) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 183 days.

(21) Appl. No.: 13/994,623

(22) PCT Filed: Dec. 15, 2011

(86) PCT No.: PCT/JP2011/079022
§ 371 (c)(1),
(2), (4) Date: Jun. 14, 2013

(87) PCT Pub. No.: WO2012/086509
PCT Pub. Date: Jun. 28, 2012

(65) Prior Publication Data
US 2013/0265503 A1 Oct. 10, 2013

(30) Foreign Application Priority Data
Dec. 22, 2010 (JP) ................. 2010-286185

(51) Int. Cl.
*F21V 8/00* (2006.01)
*G02F 1/1335* (2006.01)
(52) U.S. Cl.
CPC ............ *G02B 6/0068* (2013.01); *G02B 6/0091* (2013.01); *G02B 6/0073* (2013.01); *G02B 6/0088* (2013.01); *G02F 1/133615* (2013.01); *G02F 2201/50* (2013.01); *G02F 2203/60* (2013.01)
(58) Field of Classification Search
CPC ............................ G02B 6/0068; G02B 6/0073
USPC ............ 362/613, 97.1, 97.3; 349/65; 348/790
See application file for complete search history.

(56) References Cited

U.S. PATENT DOCUMENTS

| 8,164,704 | B2 | 4/2012 | Kim et al. |
| 2007/0279944 | A1 | 12/2007 | Sakai |
| 2011/0069509 | A1 | 3/2011 | Lin et al. |
| 2013/0265503 | A1* | 10/2013 | Hosoki .................... 348/790 |

FOREIGN PATENT DOCUMENTS

| JP | H8-262233 A | 10/1996 |
| JP | 4311454 B2 | 8/2009 |

OTHER PUBLICATIONS

U.S. Appl. No. 13/997,334, filed Jun. 24, 2013.

* cited by examiner

Primary Examiner — Anabel Ton
(74) Attorney, Agent, or Firm — Chen Yoshimura LLP (57) ABSTRACT

The backlight device 24 according to the present invention is provided with: an LED substrate 30; an LED light source 28; a light guide plate 20 having a light entrance surface 20a on a side surface; a chassis 22 having a bottom plate and a side plate; and spacer members that regulate the distance between the side plate and the light guide plate 20. The side plate has three first side plates 22c and 22d on the surface of which an LED substrate 30 is arranged, and one second side plate 22b on the surface of which the LED substrate 30 is not arranged. The spacer members have an elastic spacer member 34a and a non-elastic spacer member 34b. The space between the first side plate 22c that is opposite the second side plate 22b, across the light guide plate 20, and the light guide plate 20 is regulated by the non-elastic spacer member 34b. The space between the other side plates 22b and 22d and the light guide plate 20 is regulated by the elastic spacer member 34a.

14 Claims, 7 Drawing Sheets

LIGHTING DEVICE, DISPLAY DEVICE, AND TELEVISION RECEIVING DEVICE

TECHNICAL FIELD

The present invention relates to a lighting device, a display device, and a television receiving device.

BACKGROUND ART

Display elements of image display devices such as television receivers have recently been shifting from conventional CRTs to thin display devices that use thin display elements such as liquid crystal panels and plasma display panels. This makes it possible for image display devices to be thinner. Since the liquid crystal panels used in liquid crystal display devices do not emit light, a backlight device is additionally required as an illumination device.

Conventionally, edge-lit backlight devices with light entrance surfaces provided on side surfaces of a light guide plate, and light sources such as LEDs arranged on sides of the side surfaces of the light guide plate, are known as one example of a backlight device. Disclosed in Patent Document 1 is an edge-lit backlight device with light sources arranged in three directions around the side surfaces of the light guide plate in order to enhance brightness.

RELATED ART DOCUMENT

Patent Document

Patent Document 1: Japanese Patent Application Laid-Open Publication No. H8-262233

Problems to be Solved by the Invention

However, the backlight device disclosed in Patent Document 1 is not provided with a configuration for positioning the light guide plate. Because of this, when the light guide plate expands or the like due to heat produced in the vicinity of the light sources, the light entrance surfaces of the light guide plate and the light sources abut, and there is a risk of the light entrance surfaces and the surfaces of the light sources being damaged or the like.

SUMMARY OF THE INVENTION

The present invention was created in view of the above-mentioned problems. The present invention aims at providing a technology that can position a light guide plate, while preventing or suppressing the abutting of the light guide plate and the light sources in an edge-lit lighting device where the light sources are arranged in three directions around the side surfaces of the light guide plate.

Means for Solving the Problems

The technology disclosed in the present specification relates to a illumination device provided with: light source substrates; light sources arranged on surfaces of the light source substrates; a light guide plate that has a light entrance surface on a side face, the light guide plate being arranged so that the light sources and the light entrance face oppose each other; an accommodating member that has a bottom plate and side plates that rise on one surface side of the bottom plate and that opens to the one surface side, the accommodating member having at least the light sources and the light guide plate stored therein; and spacer members that are arranged on surfaces of the side plates on each side facing the light guide plate, the spacer members regulating a distance between each of the side plates and the light guide plate, wherein the side plates includes three first side plates having the light source substrates respectively arranged on surfaces thereof, and one second side plate not having the light source substrate arranged on a surface thereof, wherein the spacer members include first spacer members made of an elastic member, and a second spacer member made of a non-elastic member, and wherein a space between the light guide plate and one of the first side plates that is opposite the second side plate across the light guide plate is regulated by the second spacer member, and a space between each of the other side plates and the light guide plate is regulated by the first spacer member.

With the above-mentioned lighting device, the light guide plate can be positioned in the accommodating member by the first spacer members and the second spacer members. The space between the light guide plate and the first side plate that is opposite the second side plate across the light guide plate is regulated by the second spacer member, thereby making possible, when the light guide plate has expanded due to heat, the prevention or suppression of the abutting of the light guide plate and the light source substrate on the first side plate, which is regulated by the second spacer member. The space between the second side plate and the light guide plate is regulated by the first spacer member, so when the light guide plate expands due to heat, the displacement caused by the heat expansion of the light guide plate can be released to a side of the second side plate. As a result, the light guide plate can be positioned to prevent or suppress the abutting of the light guide plate and the light sources, while realizing an edge-lit lighting device where the light sources are arranged in three directions around the side surfaces of the light guide plate.

The first spacer members may be arranged on corners between the first side plates adjacent to each other.

With this configuration, space for arranging the light source substrates can be sufficiently secured by the first spacer members being arranged on the corners.

On the first side plate that is opposite the second side plate across the light guide plate, two second spacer members may hold the light source substrate therebetween.

With this configuration, on the first side plate that is opposite the second side plate across the light guide plate, space for arranging the light source substrate can be secured while regulating the distance between the first side plate and the light guide plate by the two second spacer members.

A positioning groove is provided along a thickness direction of the light guide plate on a side face of the light guide plate opposing the second side plate, and a positioning pin is provided on the bottom plate at a location corresponding to the positioning groove. The positioning pin and the positioning groove may be fitted together.

With this configuration, it is possible to position the light guide plate in a direction along the plane of the second side plate by fitting the positioning groove of the light guide plate and the positioning pin together.

A positioning hole that goes through the light guide plate is provided near a side face of the light guide plate opposing the second side plate, and a positioning pin is provided on the bottom plate at a location corresponding to the positioning hole. The positioning pin may go through the positioning hole.

With this configuration, the side of the light guide plate opposing the second side plate can be effectively positioned by making the positioning pin go through the positioning hole of the light guide plate.

With this configuration, the side of the light guide plate opposing the second side surface can be effectively positioned by making the positioning pin go through the positioning hole of the light guide plate.

A reflective member that reflects light may be attached to a side face of the light guide plate opposing the second side plate.

With this configuration, among the light guided in the light guide plate, the light heading towards the side face of the light guide plate opposing the second side plate can be reflected to inside the light guide plate by the reflective member, and the leaking of light from the side face of the light guide plate opposing the second side plate can be prevented or suppressed. In this way, a decrease in brightness of the display surface can be prevented or suppressed.

The spacer members are rectangular in a plan view, and may have a surface that is parallel to the side face of the light guide plate opposing the spacer member, and a surface that is parallel to the first side plates or the second side plate opposing the spacer member.

With this configuration, the side surface of the light guide plate and the surface of the spacer members abut. Because the surfaces of the spacer members and the first side plates and the second side plate abut, the space between the light guide plate and the first side plates and the second side plate can be effectively regulated with the spacer members.

The technology disclosed in the present specification may be a display device provided with a display panel that performs a display by using light from the above-mentioned illumination device.

The display device may be further provided with a control board that controls the display panel, and the control board may be arranged on the surface of the second side plate.

With this configuration, the space between the second side plate and the light guide plate can be effectively utilized.

The display device may be placed with the direction perpendicular to the thickness direction of the light guide plate as the vertical direction, and the second side plate may be arranged on a lower side of the light guide plate.

With this configuration, it is possible to realize a display device that has light sources respectively arranged above and to the left and right of the light guide plate.

The accommodating member is rectangular in a plan view, and the second side plate may be arranged along the long side of the accommodating member.

With this configuration, it is possible to realize a display device that is provided with a horizontally long display panel, by placing the display device so that the second side plate is arranged on a lower side of the light guide plate.

The accommodating member is rectangular in a plan view, and the second side plate may be arranged along the short side of the accommodating member.

With this configuration, it is possible to realize a display device that is provided with a vertically long display panel, by placing the display device so that the second side plate is arranged on a lower side of the light guide plate.

A display device with a liquid crystal panel using the above display panel and liquid crystal is also novel and useful. A television receiver provided with the above-mentioned display device is also novel and useful. With the above-mentioned display device and television, it is possible to increase the area of the display region.

Effects of the Invention

According to the technology disclosed in the present specification, a technology can be provided that can position a light guide plate to prevent or suppress the abutting of the light guide plate and the light sources in an edge-lit lighting device where the light sources are arranged in three directions around the side surfaces of the light guide plate.

DETAILED DESCRIPTION OF EMBODIMENTS

Embodiment 1

Embodiment 1 will be explained below with reference to the figures. An X-axis, Y-axis, and Z-axis are shown in part of each drawing. The direction of each axis is the same in the respective drawings. The direction of the Y-axis coincides with the vertical direction, and the direction of the X-axis coincides with the horizontal direction. Unless otherwise specified, the descriptions above and below are based on the vertical direction.

Figure 1:
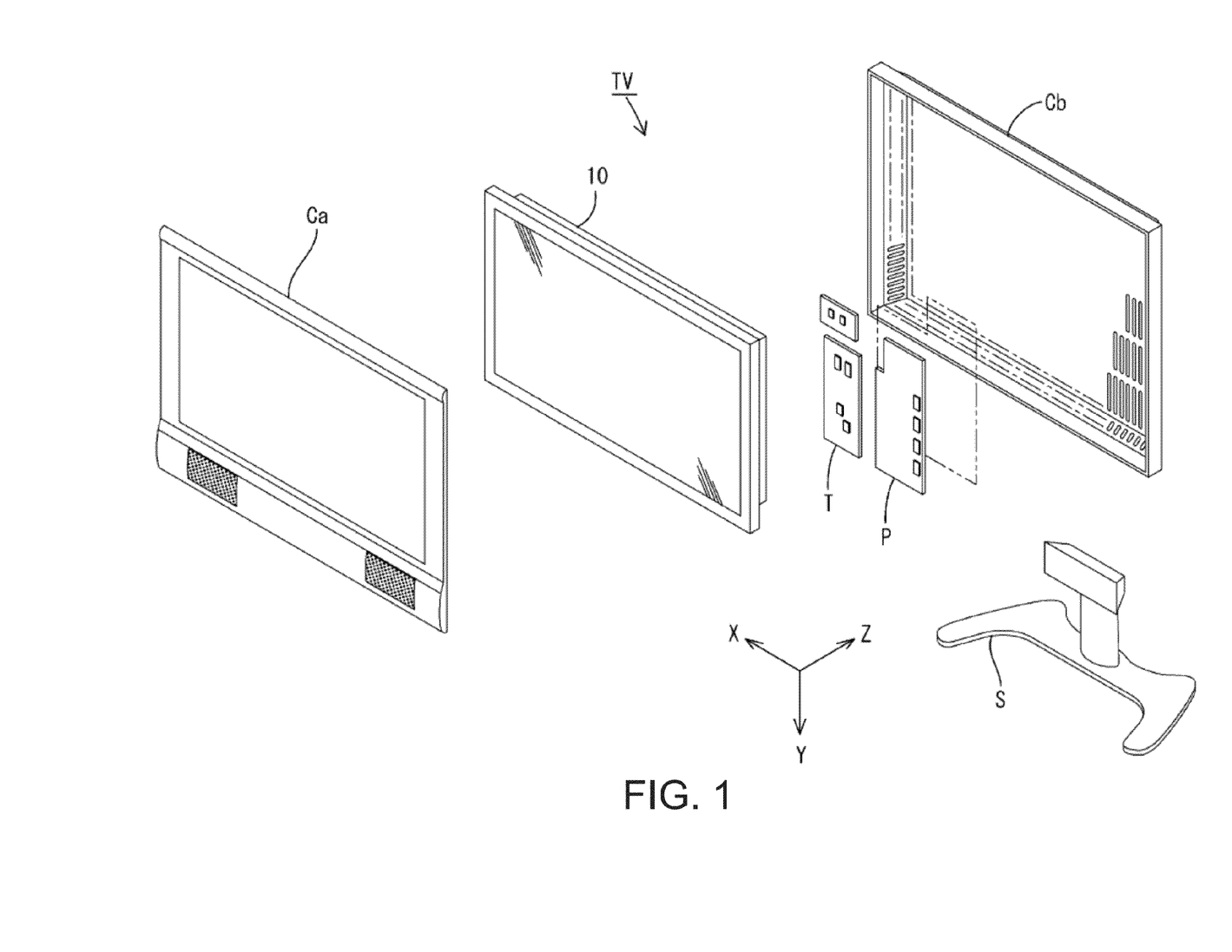
FIG. 1 shows an exploded perspective view of a television receiver TV according to Embodiment 1.

FIG. 1 shows an exploded perspective view of a television receiver TV according to Embodiment 1. The television receiver TV is provided with a liquid crystal display device 10, and front and back cabinets Ca and Cb that accommodate the display device D by sandwiching the display device D, a power source P, a tuner T, and a stand S.

Figure 2:
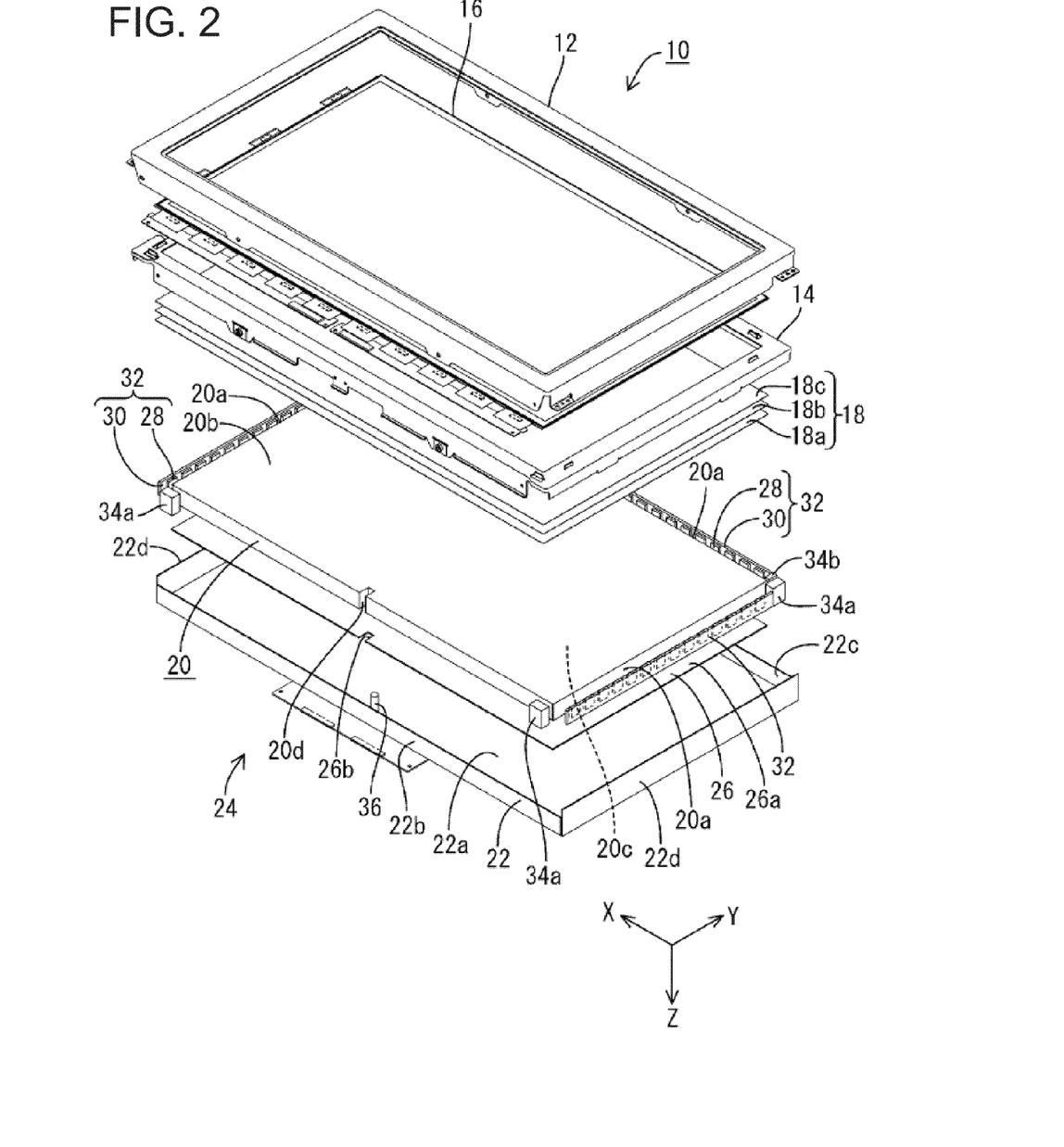
FIG. 2 shows an exploded perspective view of a liquid crystal display device 10.

FIG. 2 shows an exploded perspective view of the liquid crystal display device 10. The upper side shown in FIG. 2 is the front side, and the lower side in the same figure is the back side. As shown in FIG. 2, the liquid crystal display device 10 is a rectangle longer in the horizontal direction as a whole, and is provided with a liquid crystal panel 16 that is a display panel, and a backlight device 24 that is an external light source. These are integrally held by a frame-shaped bezel 12 or the like.

Next, the liquid crystal panel 16 will be explained. The liquid crystal panel 16 has a pair of transparent (having high light transmittance) glass substrates bonded to each other at a prescribed gap, and a liquid crystal layer (not shown) sealed between the two glass substrates. One glass substrate is provided with switching elements (TFTs, for example) each connected to a source wiring line and a gate wiring line disposed orthogonal to each other, pixel electrodes connected to the switching elements, an alignment film, and the like. The other glass substrate is provided with a color filter constituted of colored parts such as R (red), G (green), and B (blue) arranged in a prescribed pattern, an opposite electrode, an alignment film, and the like. Of these, image data and various types of control signals necessary for displaying an image are supplied from a driver circuit board (not shown) to the source wiring, the gate wiring, and the opposite electrode and the like. A polarizing plate (not shown) is arranged on the outer side of each glass substrate.

Figure 3:
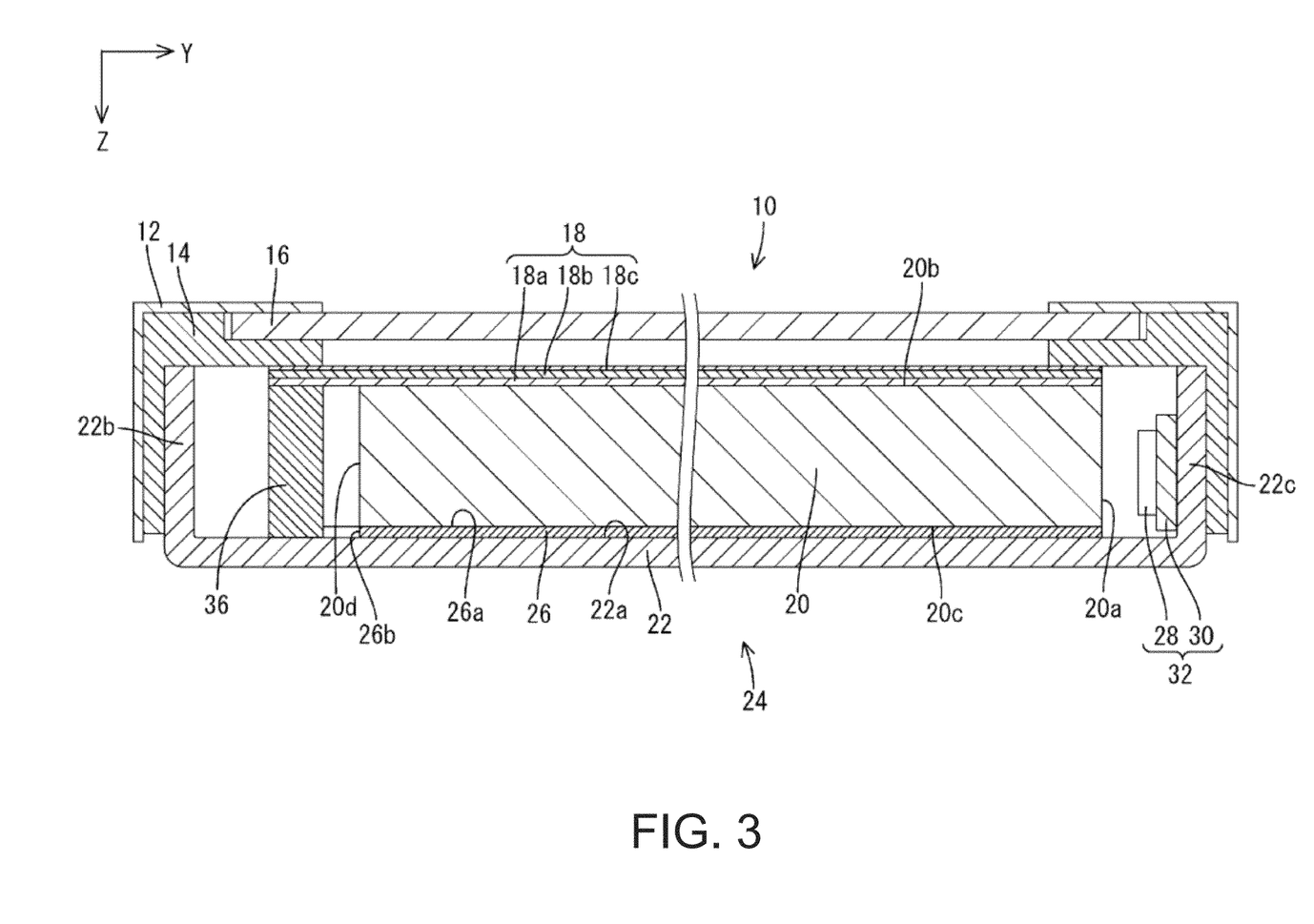
FIG. 3 shows a cross-sectional view of a liquid crystal display device 10.

Next, the backlight device 24 will be explained. FIG. 3 shows a cross-sectional view of a cross-section cut along the vertical direction (the Y-axis direction) of the liquid crystal display device 10. As shown in FIGS. 2 and 3, the backlight device 24 is provided with a frame 14, optical members 18, and a chassis 22. The frame 14 has a frame-like shape, and supports the liquid crystal panel 16 along the inner edges. The optical members 18 are placed on the front side (the light exiting surface 20*b* side) of the light guide plate 20. The chassis 22 is substantially box-shaped and opens to the front side (the light emitting side, the liquid crystal panel 16 side).

A plurality of LED (Light Emitting Diode) units 32, a reflective sheet 26, a light guide plate 20, elastic spacer members 34*a*, non-elastic spacer members 34*b*, and a positioning pin 36 are stored in the chassis 22. The LED units 32 emit light and are arranged on the outer edges (the side plates) 22*d* of both short sides of the chassis 22 and on the outer edge (the side plate) 22*c* of one of the long sides of the chassis 22. One of the longer side faces (the light entrance surface) 20*a*, and both shorter side faces (the light entrance surfaces) 20*a* of the light guide plate 20 are arranged so as to face the LED units 32, thereby guiding the light emitted from the LED units 32 into the liquid crystal panel 16. The optical members 18 are placed on the front side of this light guide plate 20. The backlight device 24 of the present embodiment adopts the so-called edge-lit method (the side lighting method), in which the light guide plate 20 and the optical members 18 are arranged directly below the liquid crystal panel 16, and the LED units 32, which are the light source, are arranged on side edges of the light guide plate 20. As described above, the backlight device 24 has LED units 32 arranged in three directions around side surfaces of the light guide plate 20, so a high degree of brightness is achieved on the display surface of the liquid crystal panel 16.

The chassis 22 is made of metal such as aluminum-based materials, and is constituted of: a bottom plate 22*a* that is rectangular in a plan view; side plates 22*b* and 22*c* that rise from outer edges of both long sides of the bottom plate 22*a*; and side plates 22*d* that rise from outer edges of both short sides of the bottom plate 22*a*. The space inside the LED units 32 in the chassis 22 is where the light guide plate 20 is placed. A power supply circuit board (not shown) that supplies power to the LED units 32 and the like are attached to the back side of the bottom plate 22*a*.

The optical members 18 include a diffusion sheet 18*a*, a lens sheet 18*b*, and a reflective polarizing plate 18*c* stacked in this order from the light guide plate 20 side. The diffusion sheet 18*a*, lens sheet 18*b*, and reflective polarizing plate 18*c* have a function that converts the light emitted from the LED units 32 and then passed through the light guide plate 20 into planar light. The liquid crystal panel 16 is placed on the upper side of the reflective polarizing plate 18*d*, and the optical members 18 are arranged between the light guide plate 20 and the liquid crystal panel 16.

Each LED unit 32 has white-light emitting LED light sources 28 arranged in a row on a rectangle-shaped LED substrate 30 made of a resin. The LED substrates 30 are fastened to the side plates 22*c* and 22*d* of the chassis 22 by screws or the like. Below, of the four side plates 22*b*, 22*c* and 22*d* of the chassis 22, the three side plates each with an LED substrate 30 arranged on the surface thereof are referred to as the first side plates 22*c* and 22*d*, and the one side plate without an LED substrate 30 arranged on the surface thereof is referred to as the second side plate 22*b*.

The LED light source 28 may be created by coating a fluorescent material that has an emission peak in a yellow region on a blue light emitting element, thereby emitting white light. The LED light source 28 may be created by coating a fluorescent material that has respective emission peaks in green and red regions on a blue light emitting element, thereby emitting white light. The LED light source 28 may be created by coating a fluorescent material that has an emission peak in a green region on a blue light emitting element, and combining with a red light emitting element, thereby emitting white light. The LED light source 28 may be created by combining a blue light emitting element, a green light emitting element, and a red light emitting element, thereby emitting white light. Furthermore, the LED light source 28 may be created by combining an ultraviolet light emitting element and a fluorescent material. In particular, the LED light source 28 may be created by coating fluorescent materials that have respective emission peaks in blue, green, and red on an ultraviolet light emitting element, thereby emitting white light.

The reflective sheet 26 is made of a synthetic resin, with the surface thereof being a white color that has excellent light reflectivity, and is placed on the front side of the bottom plate 22*a* of the chassis 22. The reflective sheet 26 has a reflective surface on the front side thereof. This reflective surface abuts the opposite surface 20*c* of the light guide plate 20, and can reflect light that has leaked toward the opposite surface 20*c* from the LED units 32 or the light guide plate 20.

The light guide plate 20 is a rectangular plate-shaped member formed of a resin with great light transmittance (a high degree of transparency) such as acrylic, and abuts the reflective sheet 26, along with being supported by the chassis 22. As shown in FIG. 2, the light guide plate 20 is arranged between each LED unit 32 such that the light exiting surface 20*b*, which is the main surface, is facing the diffusion sheet 18*a*, and the opposite surface 20*c* on the opposite side of the light exiting surface 20*b* is facing the reflective sheet 26. With such a light guide plate 20 being provided, the light produced by the LED units 32 enters from the light entrance faces 20*a* of the light guide plate 20, and is emitted from the light exiting surface 20*b* opposing the diffusion sheet 18*a*, thereby being radiated to the liquid crystal panel 16 from the back side thereof.

Figure 4:
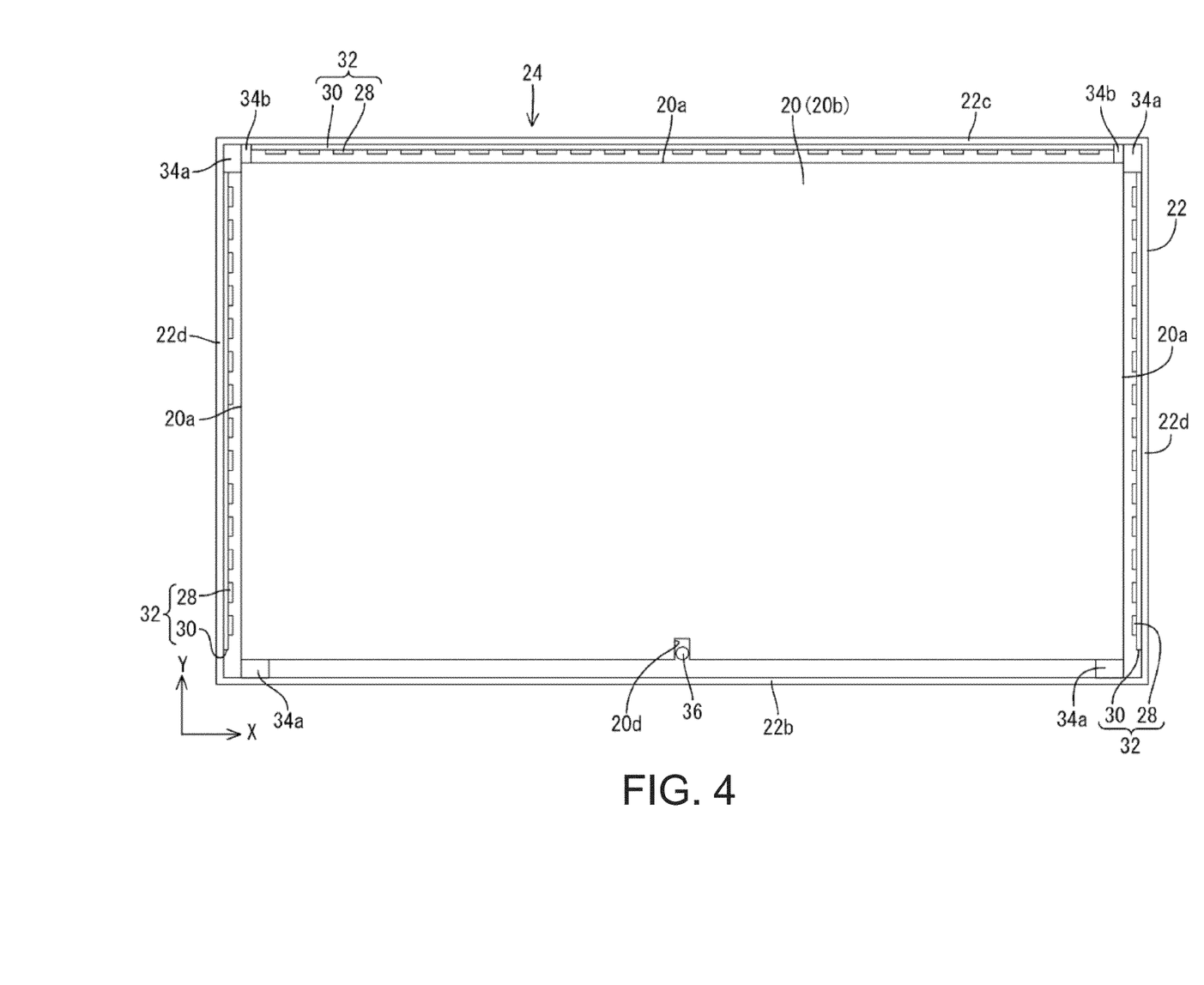
FIG. 4 shows a plan view of a backlight device 24.

Next, a configuration for positioning the light guide plate 20 will be explained. FIG. 4 shows a plan view of a backlight device 24. As shown in FIG. 4, the space between each side plate 22*b*, 22*c*, and 22*d* of the chassis 22 and the light guide plate 20 is regulated by elastic spacer members 34*a* or non-elastic spacer members 34*b*. The elastic spacer members 34*a* are formed of an elastic member such as a cushion material, and the non-elastic spacer members 34*b* are formed of a non-elastic member such as glass.

The space between the second side plate 22*b* of the chassis 22 and the light guide plate 20 is regulated by two elastic spacer members 34*a*. Each of these two elastic spacer members 34*a* is placed on each side of the second side plate 22*b*. The space between the first side plate 22*c*, which is opposite the second side plate 22*b* across the light guide plate 20, and the light guide plate 20 is regulated by two non-elastic spacer members 34*b*. Each of these two non-elastic spacer members 34*b* is placed on each side of the first side plate 22*c*. The LED substrate 30 arranged on the surface of the first side plate 22*c* is arranged between the two non-elastic spacer members 34*b*. In other words, the two non-elastic spacer members 34*b* hold the LED substrate 30 arranged on the surface of the first side plate 22*c* therebetween. As described above, the light guide plate 20 is regulated and positioned in the vertical direction (the Y-axis direction) inside the chassis 22 by the two elastic spacer members 34*a* and the two non-elastic spacer members 34*b*.

The space between the first side plates 22d provided on both sides of the horizontal direction of the chassis 22 and the light guide plate 20 is regulated by two elastic spacer members 34a. Each of these two elastic spacer members 34a is arranged on each of the corners between the adjacent first side plate 22c and first side plates 22d. With this configuration, the light guide plate 20 is regulated and positioned in the horizontal direction (the X-axis direction) inside the chassis 22.

As shown in FIG. 4, the elastic spacer members 34a and the non-elastic spacer members 34b are respectively rectangular in a plan view. The elastic spacer members 34a have a surface that is parallel to the side surface of the light guide plate 20 opposing the elastic spacer members 34a, and a surface that is parallel to the first side plates 22d or the second side plate 22b opposing the elastic spacer members 34a. The non-elastic spacer members have a surface that is parallel to the side surface of the light guide plate 20 opposing the non-elastic spacer members 34b, and a surface that is parallel to the first side plate 22c opposing the non-elastic spacer members 34b.

As shown in FIGS. 2 to 4, a positioning groove 20d is provided along the thickness direction (the Z-axis direction) of the light guide plate 20 on a side surface of the light guide plate 20 opposing the second side plate 22b of the chassis 22. A positioning notch 26b is provided in the reflective sheet 26 at a location corresponding to the positioning groove 20d. The positioning groove 20d and the positioning notch 26b open to a side of the second side plate 22b. A cylindrical-shaped positioning pin 36 that projects towards a side of the optical members 18 from a side of the bottom plate 22a of the chassis 22 is provided on the bottom plate 22a of the chassis 22 at a location corresponding to the positioning groove 20d and the positioning notch 26b. The positioning pin 36 and the positioning groove 20d are fitted together. With this configuration, the light guide plate 20 is effectively regulated and positioned in the horizontal direction (the X-axis direction) inside the chassis 22.

As described above, in the backlight device 24 of the present embodiment, the light guide plate 20 can be positioned inside the chassis 22 by the elastic spacer members 34a and the non-elastic spacer members 34b. And, the space between the first side plate 22c, which is opposite the second side plate 22b across the light guide plate 20, and the light guide plate 20 is regulated by the non-elastic spacer members 34b. This makes possible, when the light guide plate 20 has expanded due to heat, the prevention or suppression of the abutting of the light guide plate 20 and the LED substrate 30 arranged on the first side plate 22c, which is regulated by the non-elastic spacer members 34b. The space between the second side plate 22b and the light guide plate 20 is regulated by the elastic spacer members 34a, so when the light guide plate 20 expands due to heat, the displacement caused by the heat expansion of the light guide plate 20 can be released to a side of the second side plate 22b. Because of this, the light guide plate 20 can be positioned to prevent or suppress the abutting of the light guide plate 20 and the LED light sources 28, while realizing an edge-lit backlight device 24 where the LED light sources 28 are arranged in three directions around the side surfaces of the light guide plate 20.

In the backlight device 24 of the present embodiment, the position of the light guide plate 20 is defined with respect to the vertical direction and the horizontal direction, so even if a vertical or horizontal vibration or the like is applied, a shifting in the location of the light guide plate 20 and a change in the distance between the light guide plate 20 and the LED light sources 28 can be prevented or suppressed. Therefore, in the backlight device 24, it is possible to realize good optical characteristics.

In the backlight device 24 of the present embodiment, elastic spacer members 34a are arranged on respective corners between the adjacent first side plate 22c and first side plates 22d. Therefore, space for arranging an LED substrate 30 can be sufficiently secured.

In the backlight device 24 of the present embodiment, two non-elastic spacer members 34b hold therebetween the LED substrate 30 on the first side plate 22c that is opposite the second side plate 22b across the light guide plate 20. Therefore, in the first side plate 22c that is opposite the second side plate 22b across the light guide plate 20, space for arranging the LED substrate 30 can be secured, while regulating the distance between the first side plate 22c and the light guide plate 20 by the two non-elastic spacer members 34b.

In the backlight device 24 of the present embodiment, a positioning groove 20d is provided along the thickness direction (the Z-axis direction) of the light guide plate 20 on a side surface of the light guide plate 20 opposing the second side plate 22b, and a positioning pin 36 is provided on the bottom plate 22a at a location corresponding to the positioning groove 20b. The positioning pin 36 and the positioning groove 20d are fitted together. Therefore, it is possible to position the light guide plate 20 in the direction along the plate surface of the second side plate 22b.

In the backlight device 24 of the present embodiment, the elastic spacer members 34a are rectangular in a plan view, and have a surface that is parallel to the side surface of the light guide plate 20 opposing the elastic spacer members 34a, and a surface that is parallel to the first side plates 22d or the second side plate 22b opposing the elastic spacer members 34a. Therefore, surfaces of the side faces of the light guide plate 20 and the elastic spacer members 34a are abutting, and surfaces of the elastic spacer members 34a and the first side plates 22d and the second side plate 22b are abutting. The non-elastic spacer members 34b are rectangular in a plan view, and have a surface that is parallel to the side surface of the light guide plate 20 opposing the non-elastic spacer members 34b, and a surface that is parallel to the first side plate 22c opposing the non-elastic spacer members 34b. Therefore, surfaces of the side face of the light guide plate 20 and the non-elastic spacer members 34b are abutting, and surfaces of the non-elastic spacer members 34b and the first side plate 22c are abutting. With the configuration described above, the space between the light guide plate 20 and the first side plates 22c and 22d and the second side plate 22b can be effectively regulated by the elastic spacer members 34a and the non-elastic spacer members 34b.

The liquid crystal display device 10 of the present embodiment is placed with the direction (the Y-axis direction) perpendicular to the thickness direction (the Z-axis direction) of the light guide plate 20 as the vertical direction. The second side plate 22b is arranged on a lower side of the light guide plate 20. With this configuration, it is possible to realize a liquid crystal display device 10 that has LED light sources 28 respectively arranged above and to the left and right of the light guide plate.

In the liquid crystal display device 10 of the present embodiment, the chassis 22 is rectangular in a plan view, and the second side plate 22b is arranged along the long side of the chassis 22. Therefore, by placing the liquid crystal display device 10 so that the second side plate 22b is arranged on the lower side of the light guide plate 20, it is possible to realize a liquid crystal display device 10 that is provided with a horizontally long liquid crystal panel 16.

Embodiment 2

Figure 5:
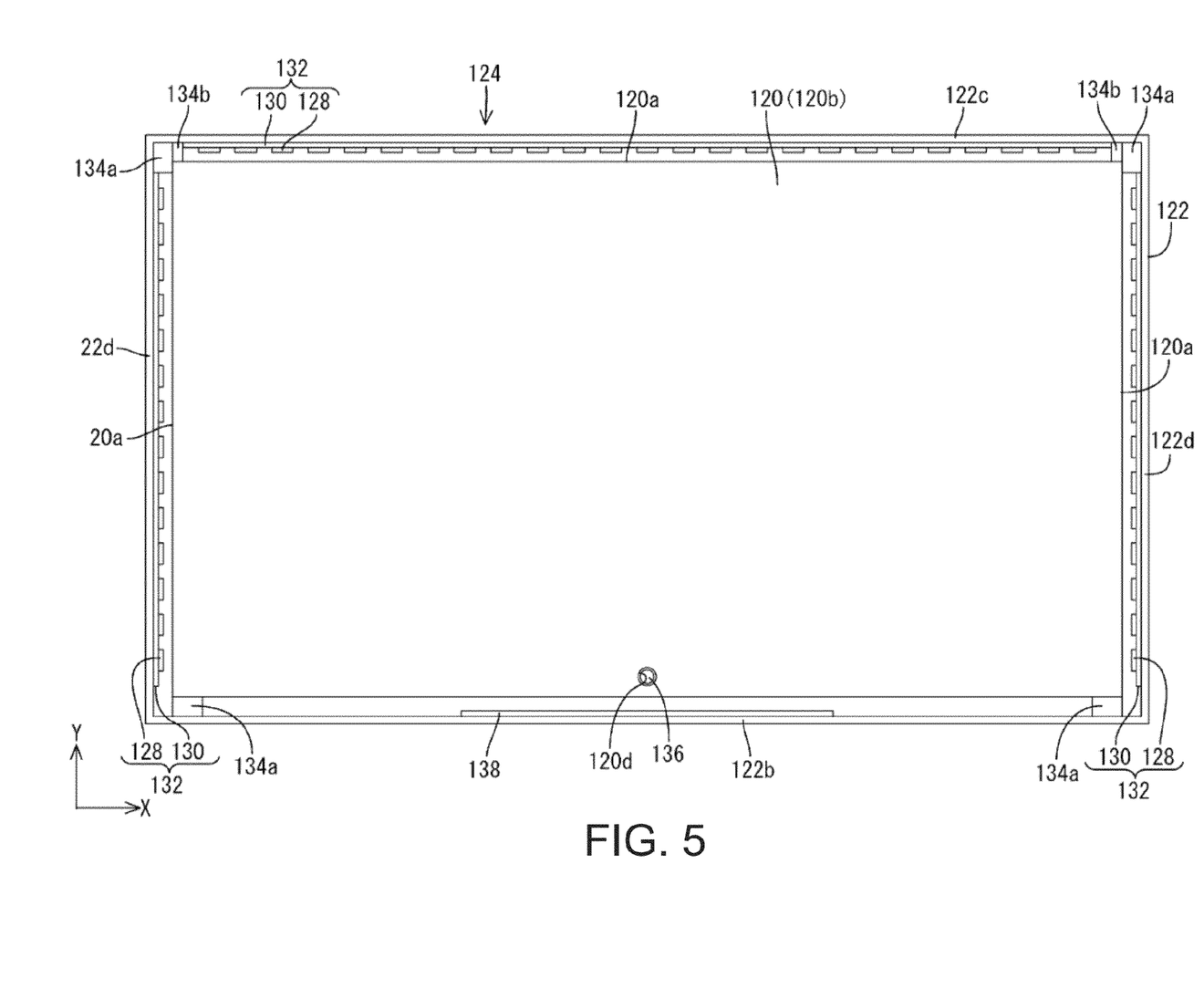
FIG. 5 shows a plan view of a backlight device 124 according to Embodiment 2.

Embodiment 2 will be explained below with reference to the figure. FIG. 5 shows a plan view of a backlight device 124 according to Embodiment 2. In Embodiment 2, the arrangement of a driver circuit board 138, and the fitting aspect of a positioning pin 136 and a light guide plate 120 differ from those of Embodiment 1. The other configurations are the same as those in Embodiment 1, so explanations of the structures, functions, and effects thereof will not be repeated. In FIG. 5, the components where 100 has been added to the reference numerals of FIG. 4 are the same components as described in Embodiment 1.

The backlight device 124 of Embodiment 2, as shown in FIG. 5, has a driver circuit board 138 arranged on a surface of a second side plate 122b for supplying image data and various types of control signals necessary for displaying images displayed by the liquid crystal panel 16. Therefore, the space between the second side plate 122b and the light guide plate 120 can be utilized effectively, and space conventionally provided for accommodating the drive circuit board 138 can be eliminated. With this configuration, if the liquid crystal display device is placed so that the second side plate 122b is arranged on a lower side of the light guide plate 120, the thickness of the upper part of the liquid crystal display device can be reduced.

In the backlight device 124 of Embodiment 2, as shown in FIG. 5, a positioning hole 120d is provided near a side surface of the light guide plate 120 opposing the second side plate 122b of a chassis 122 along the thickness direction (the Z-axis direction) of the light guide plate 120. A positioning opening (not shown) is provided in a reflective sheet at a location corresponding to the positioning hole 120d. A cylindrical-shaped positioning pin 136 that projects towards optical members 118 from a side of the bottom plate 122a of the chassis 122 is provided on the bottom plate 122a of the chassis 122 at a location corresponding to the positioning hole 120d and the positioning opening 126b. The positioning pin 136 goes through the positioning hole 120d. In this case, not just the horizontal direction but also the vertical direction of the side of the light guide plate 120 opposing the second side surface 122b is regulated by the positioning pin 136. Therefore, in the backlight device 124 of Embodiment 2, the side of the light guide plate 120 opposing the second side surface 122b can be effectively positioned by the positioning pin 136.

Embodiment 3

Figure 6:
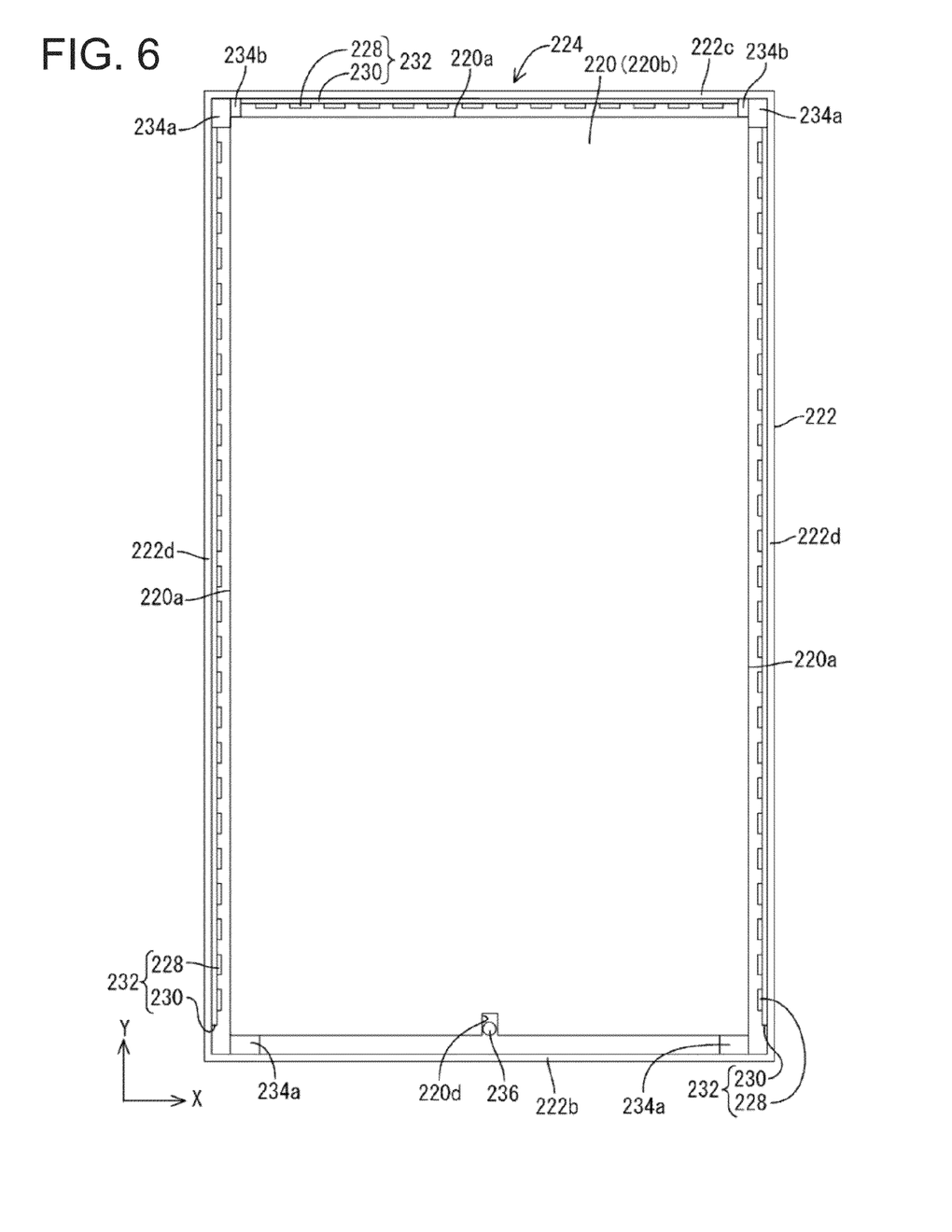
FIG. 6 shows a plan view of a backlight device 224 according to Embodiment 3.

Embodiment 3 will be explained below with reference to the figure. FIG. 6 shows a plan view of a backlight device 224 according to Embodiment 3. In Embodiment 3, the aspect in which the liquid crystal display device is placed in the television receiver differs from that of Embodiment 1. The other configurations are the same as those in Embodiment 1, so explanations of the structures, functions, and effects thereof will not be repeated. In FIG. 6, the components where 200 has been added to the reference numerals of FIG. 4 are the same components as described in Embodiment 1.

In the backlight device 224 of Embodiment 3, as shown in FIG. 6, a chassis 222 is rectangular in a plan view. In the backlight device 224, when used as a television receiver, the chassis 222 is placed so as to be vertically long. Therefore, in the backlight device 224 of Embodiment 3, one of the side plates on the short side direction of the chassis 222 is a second side plate 222b, and the other side plate is a first side plate 222c. Both side plates on the long side direction of the chassis 222 are, respectively, first side plates 222d. A positioning groove 220d is provided on a side surface on the short side direction of a light guide plate 220 opposing the second side plate 222b, and the positioning groove 220d and a positioning pin 236 are fitted together. In the backlight device 224, even with such a configuration, the abutting of the light guide plate 220 and LED light sources 228 can be prevented or suppressed, while positioning the light guide plate 220 inside the chassis 222 by elastic spacer members 234a and non-elastic spacer members 234b.

Embodiment 4

Figure 7:
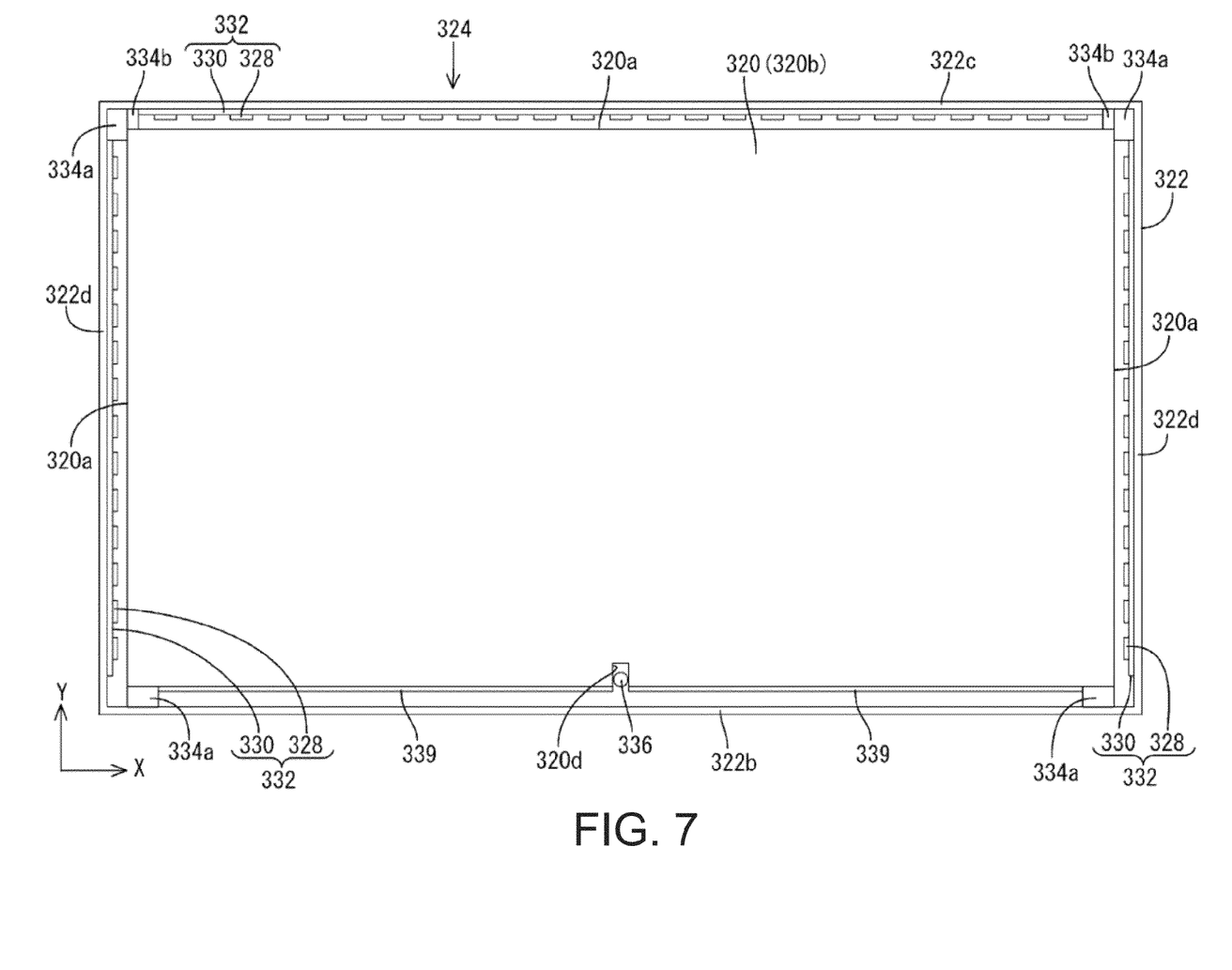
FIG. 7 shows a plan view of a backlight device 324 according to Embodiment 4.

Embodiment 4 will be explained below with reference to the figure. FIG. 7 shows a plan view of a backlight device 324 according to Embodiment 4. Embodiment 4 differs from Embodiment 1 in that a reflective sheet 339 for a light guide plate is provided. The other configurations are the same as those in Embodiment 1, so explanations of the structures, functions, and effects thereof will not be repeated. In FIG. 7, the components where 300 has been added to the reference numerals of FIG. 4 are the same components as described in Embodiment 1.

In the backlight device 324 of Embodiment 4, the reflective sheet 339 for light guide plate that reflects light is affixed on a surface of a side face of the light guide plate 320 opposing the second side plate 322b, except for the location where the positioning groove 320d is provided and the locations abutting with the elastic spacer members 334a. Therefore, among the light guided inside the light guide plate 320, the light heading towards the side face of the light guide plate 320 opposing the second side plate 322b can be reflected to inside the light guide plate 320 by the reflective sheet 339 for light guide plate, and the leaking of light from the side face of the light guide plate 320 opposing the second side plate 322b can be prevented or suppressed. With this configuration, a decrease in brightness of the display surface of the liquid crystal panel can be prevented or suppressed.

The relationship between the configurations of the respective embodiments and the configurations of the present invention will be explained. The LED substrates 30, 130, and 230 are examples of a "light source substrate." The LED light sources 28, 128, and 228 are examples of a "light source." The chassis 22, 122, and 222 are examples of an "accommodating member." The first side plates 22c, 22d, 122c, 122d, 222c, and 222d are examples of a "first side plate." The second side plates 22b, 122b, and 222b are examples of a "second side plate." The elastic spacer members 34a, 134a, and 234a are examples of a "first spacer member." The non-elastic spacer members 34b, 134b, 234b are examples of a "second spacer member." The backlight devices 24, 124, 224 are examples of an "illumination device." The reflective sheet 339 for light guide plate is an example of a "reflective member." The driver circuit board 138 is an example of a "control board."

Examples of modification of each embodiment described above are listed below.

(1) In each embodiment above, the space between the second side plate and the light guide plate is regulated by two elastic spacer members, but regulation by one elastic spacer member may also be adopted, and regulation by three or more elastic spacer members may also be adopted.

(2) In each embodiment above, the space between the light guide plate and the first side plate that is opposite the second side plate across the light guide plate is regulated by two non-elastic spacer members, but regulation by one non-elastic spacer member may also be adopted, and regulation by three or more non-spacer members may also be adopted.

(3) In each embodiment above, the spaces between the light guide plate and the two first side plates not opposing the second side plate across the light guide plate are respectively regulated by one elastic spacer member, but regulation by two or more elastic spacer members, respectively, may also be adopted.

(4) In each embodiment above, the spaces between the light guide plate and the two first side plates not opposing the second side plate across the light guide plate are respectively regulated by an elastic spacer member, and these two elastic spacer members are each arranged on a corner between the adjacent first side plates, but a configuration in which these elastic spacer members are arranged at a different location may also be adopted.

(5) The arrangement, shape, material and the like of the spacer members can be modified as appropriate in addition to those indicated in the above embodiments.

(6) In each embodiment above, a liquid crystal display device using a liquid crystal panel is shown as a display panel, but the present invention is also applicable to display devices that use other types of display panels.

(7) In each embodiment above, a television receiver equipped with a tuner is shown, but the present invention is also applicable to display devices not equipped with a tuner.

Each embodiment of the present invention was described above in detail, but these are merely illustrative, and not limiting the scope of the claims. The technical scope defined by the claims includes various modifications of the specific examples described above.

The technical elements described in the present specification and the drawings demonstrate technical utility separately or in all types of combinations, and are not limited to the combinations disclosed in the claims at the time of filing of the application. The features illustrated in the present specification and the drawings can simultaneously achieve multiple aims, and have technical utility by achieving at least any one of these aims.

DESCRIPTION OF REFERENCE CHARACTERS

TV television receiver
Ca, Cb cabinet
T tuner
S stand
10 liquid crystal display device
12 bezel
14 frame
16 liquid crystal panel
18 optical member
20, 120, 220, 320 light guide plate
22, 122, 222, 322 chassis
22b, 122b, 222b, 322b second side plate
22c, 22d, 122c, 122d, 222c, 222d, 322d first side plate
24, 124, 224, 324 backlight device
26 reflective sheet
28, 128, 228, 328 LED light source
30, 130, 230, 330 LED substrate
32, 132, 232, 332 LED unit
34a, 134a, 234a, 334a elastic spacer member
34b, 134b, 234b, 334b non-elastic spacer member
36, 136, 236, 336 positioning pin
339 light guide plate side reflective sheet

The invention claimed is:

1. An illumination device, comprising:
light source substrates;
light sources arranged on surfaces of said light source substrates;
a light guide plate that has a light entrance face on a side face, the light guide plate being arranged so that the light sources and the light entrance face oppose each other;
an accommodating member that has a bottom plate and side plates that rise on one surface side of said bottom plate, the accommodating member opening to the one surface side and having at least the light sources and the light guide plate placed therein; and
spacer members arranged on surfaces of the side plates on each side facing the light guide plate, the spacer members being provided to regulate a distance between each of said side plates and the light guide plate,
wherein the side plates include three first side plates having the light source substrates arranged on respective surface thereof, and one second side plate not having the light source substrate arranged on a surface thereof,
wherein the spacer members include first spacer members made of an elastic material, and a second spacer member made of a non-elastic material; and
wherein a space between the light guide plate and one of the first side plates that is opposite the second side plate across the light guide plate is regulated by the second spacer member, and spaces between the other side plates and the light guide plate are regulated by the first spacer members.

2. The illumination device according to claim 1, wherein the first spacer members are arranged on corners between the first side plates adjacent to each other.

3. The illumination device according to claim 1, wherein, on the first side plate that is opposite the second side plate across the light guide plate, two of said second spacer members hold the light source substrate therebetween.

4. The illumination device according to claim 1, wherein a positioning groove is provided along a thickness direction of the light guide plate on a side face of the light guide plate facing the second side plate,
wherein a positioning pin is provided on the bottom plate at a location corresponding to the positioning groove, and
wherein the positioning pin and the positioning groove are fitted together.

5. The illumination device according to claim 1, wherein a positioning hole that penetrates the light guide plate is provided near a side face of the light guide plate opposing the second side plate,
wherein a positioning pin is provided on the bottom plate at a location corresponding to the positioning hole, and
wherein the positioning pin goes through the positioning hole.

6. The illumination device according to claim 1, wherein a reflective member that reflects light is attached to a side face of the light guide plate opposing the second side plate.

7. The illumination device according to claim 1, wherein the spacer members are rectangular in a plan view, and each has a surface that is parallel to a side face of the light guide plate opposing said spacer member, and a surface that is parallel to the first side plates or the second side plate opposing said spacer member.

8. A display device, comprising a display panel that performs a display by using light from the illumination device according to claim 1.

9. The display device according to claim 8, further comprising a control board that controls the display panel,
wherein said control board is arranged on a surface of the second side plate.

10. The display device according to claim 8, wherein the display device is placed with a direction perpendicular to a thickness direction of the light guide plate being a vertical direction, and
wherein the second side plate is arranged on a lower side of the light guide plate.

11. The display device according to claim 8, wherein the accommodating member is rectangular in a plan view, and
   wherein the second side plate is arranged along a long side direction of the accommodating member.

12. The display device according to claim 8, wherein the accommodating member is rectangular in a plan view, and
   wherein the second side plate is arranged along a short side direction of the accommodating member.

13. The display device according to claim 8, wherein the display panel is a liquid crystal panel that uses liquid crystal.

14. A television receiving device, comprising the display device according to claim 8.

* * * * *